(12) United States Patent
Hsieh et al.

(10) Patent No.: US 10,961,325 B2
(45) Date of Patent: Mar. 30, 2021

(54) AMPHIPHILIC POLYMER AND MANUFACTURING METHOD THEREOF, USE OF AMPHIPHILIC POLYMER AS CONTACT LENS MATERIAL, CONTACT LENS MATERIAL INCLUDING AMPHIPHILIC POLYMER

(71) Applicant: NATIONAL CHIAO TUNG UNIVERSITY, Hsinchu (TW)

(72) Inventors: Yun-Ru Hsieh, Taichung (TW); Dean-Mo Liu, Zhubei (TW); Yu-Cheng Jian, Taipei (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 16/407,865

(22) Filed: May 9, 2019

(65) Prior Publication Data

US 2020/0270371 A1 Aug. 27, 2020

(30) Foreign Application Priority Data

Feb. 26, 2019 (TW) .................................. 108106557

(51) Int. Cl.
  *C08B 37/08* (2006.01)
  *G02B 1/04* (2006.01)

(52) U.S. Cl.
  CPC ............ *C08B 37/003* (2013.01); *G02B 1/043* (2013.01)

(58) Field of Classification Search
  CPC .............................. C08B 37/003; G02B 1/043
  See application file for complete search history.

(56) References Cited

FOREIGN PATENT DOCUMENTS

WO  WO-2011007454 A1 * 1/2011 ........... A61L 29/043

OTHER PUBLICATIONS

Anirudhan, T. et al "Extended wear therapeutic contact lens . . . " Eur. J. Pharm. Biopharm., vol. 109, pp. 61-71. (Year: 2016).*
Patel, N. et al "Controlled release of carbamazepine from carboxymethyl chitosan . . . " J. Appl. Polym. Sci., vol. 115, pp. 3442-3450. (Year: 2010).*

* cited by examiner

*Primary Examiner* — Leigh C Maier
(74) *Attorney, Agent, or Firm* — Birch, Stewart, Kolasch & Birch, LLP

(57) ABSTRACT

An amphiphilic polymer, an amphiphilic polymer manufacturing method, use of an amphiphilic polymer as a contact lens material, and a contact lens material including the same are provided. The amphiphilic polymer includes amino-conjugated mono-HEMA (mHEMA-$NH_2$) and amphiphilic chitosan bonded to the same. The amphiphilic polymer manufacturing method includes providing a mHEMA-$NH_2$, providing an amphiphilic chitosan, and bonding the mHEMA-$NH_2$ to the amphiphilic chitosan.

8 Claims, 7 Drawing Sheets

AMPHIPHILIC POLYMER AND MANUFACTURING METHOD THEREOF, USE OF AMPHIPHILIC POLYMER AS CONTACT LENS MATERIAL, CONTACT LENS MATERIAL INCLUDING AMPHIPHILIC POLYMER

BACKGROUND

Technical Field

The present invention relates to an amphiphilic polymer. Particularly, the present invention relates to an amphiphilic HEMA-chitosan polymer which can be used as a contact lens material.

Related Art

Today's contact lenses emphasize high oxygen permeability, high transparency, and high hydrophilicity, while lens functionalization (medical, diagnostic, intelligent) is the future development goal. At present, the oxygen permeability of commercially available contact lenses is mainly increased by the addition of silicone components into the contact lens formulation solution, but after the addition, the phenomena of decreased transparency and mutual insolubility are generated.

Hydrogel or silicone hydrogel is a widely used biomaterial. Contact lenses, artificial skin, and biomedical implants are some of the most important medical components. There are many holes in the medical components produced by hydrogel (like poly-HEMA) or silicone. Although these holes can increase the permeability and water absorption, when a composite material is formed, many of the materials of a dispersed phase are gradually lost, and the accompanying functions (medical, diagnostic, intelligent) will gradually disappear. Therefore, if these functional dispersed phases (such as nanoparticles, carried drugs, special functional polymers, etc.) can be fixed in the substrate, in practical applications, it will be more reliable, functional, and persistent.

In the prior art, a mono-HEMA (mHEMA) molecule is bonded to a highly hydrophilic polysaccharide having a —COOH functional group. It is quite rare to form a HEMA-polysaccharide copolymer molecule with self-assembly capability. Generally, HEMA is used for bonding. In the manufacturing process, organic synthesis technology is often used for purification, but the technical process of separation is complicated. In terms of application, limited by the effective bonding of polysaccharides with other polymer substrates, the optical penetrability and mechanical strength are reduced, and further the drug carrier function is affected, especially in application on drug-loaded medical devices.

SUMMARY

The main objective of the present invention is to provide an amphiphilic polymer.

Another objective of the present invention is to provide an amphiphilic polymer manufacturing method.

Another objective of the present invention is to provide use of the amphiphilic polymer as a contact lens material.

Another objective of the present invention is to provide a contact lens material including the amphiphilic polymer, which has good transparency, oxygen permeability, and water retention.

The amphiphilic polymer includes amino-conjugated mono-HEMA (mHEMA-NH$_2$) and amphiphilic chitosan bonded to the same.

In one embodiment of the present invention, the amphiphilic polymer has the following structure:

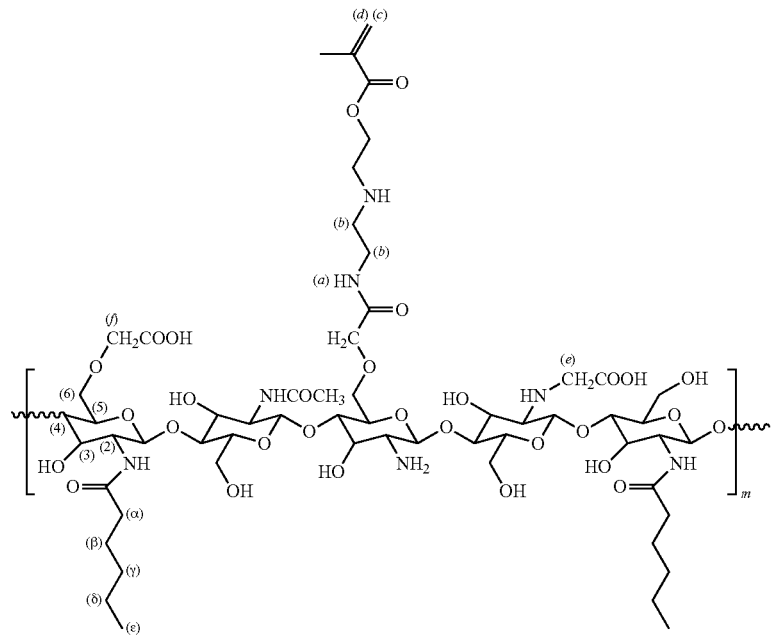

The amphiphilic polymer manufacturing method includes (S1000) providing a mHEMA-NH$_2$; (S2000) providing an amphiphilic chitosan; and (S3000) bonding the mHEMA-NH$_2$ to the amphiphilic chitosan.

In one embodiment of the present invention, ethylene diamine, potassium carbonate, and mHEMA-4-toluenesulfonyl-grafted (mHEMA-Ts) react to obtain the mHEMA-NH$_2$.

In one embodiment of the present invention, mHEMA reacts with 4-toluenesulfonyl chloride (TsCl) to obtain the mHEMA-4-toluenesulfonyl-grafted.

In one embodiment of the present invention, during reaction of the mHEMA with the 4-toluenesulfonyl chloride, 4-dimethylaminopyridine (DMAP) is used as a catalyst.

In one embodiment of the present invention, in the step S3000, 1-ethyl-3-(3-dimethylaminopropyl)carbodiimide (EDC) is used as a catalyst.

In one embodiment of the present invention, in the step S3000, N-hydroxysuccinimide (NHS) is used as a catalyst.

DETAILED DESCRIPTION

The amphiphilic polymer includes amino-conjugated mono-HEMA (mHEMA-NH$_2$) and amphiphilic chitosan bonded to the same, wherein the amphiphilic chitosan includes carboxymethyl hexanoyl chitosan (CHC), deoxycholic acid modified carboxymethylated chitosan (DCMC), lauroyl sulfated chitosan (LSC) or methylpyrrolidone chitosan (MPC).

In one embodiment, the amphiphilic chitosan includes a carboxyl group (—COOH). More specifically, the amphiphilic polymer has the following structure:

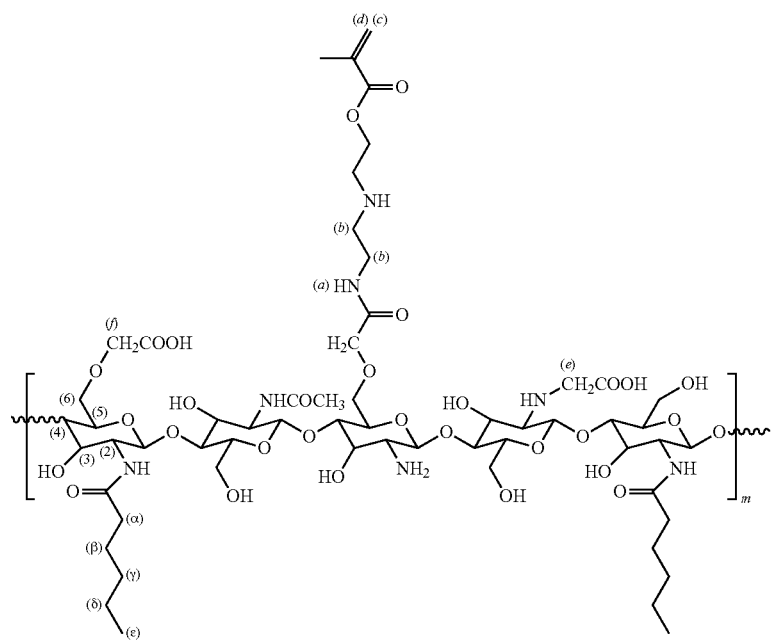

wherein the amino group of the mHEMA-NH$_2$ is bonded to the carboxyl group of the amphiphilic chitosan, so the HEMA is bonded to the amphiphilic chitosan. However, in various embodiments, the amphiphilic chitosan is not limited to including the carboxyl group, that is, the mHEMA-NH$_2$ and the amphiphilic chitosan can be bonded by a group other than the carboxyl group.

Figure 1:
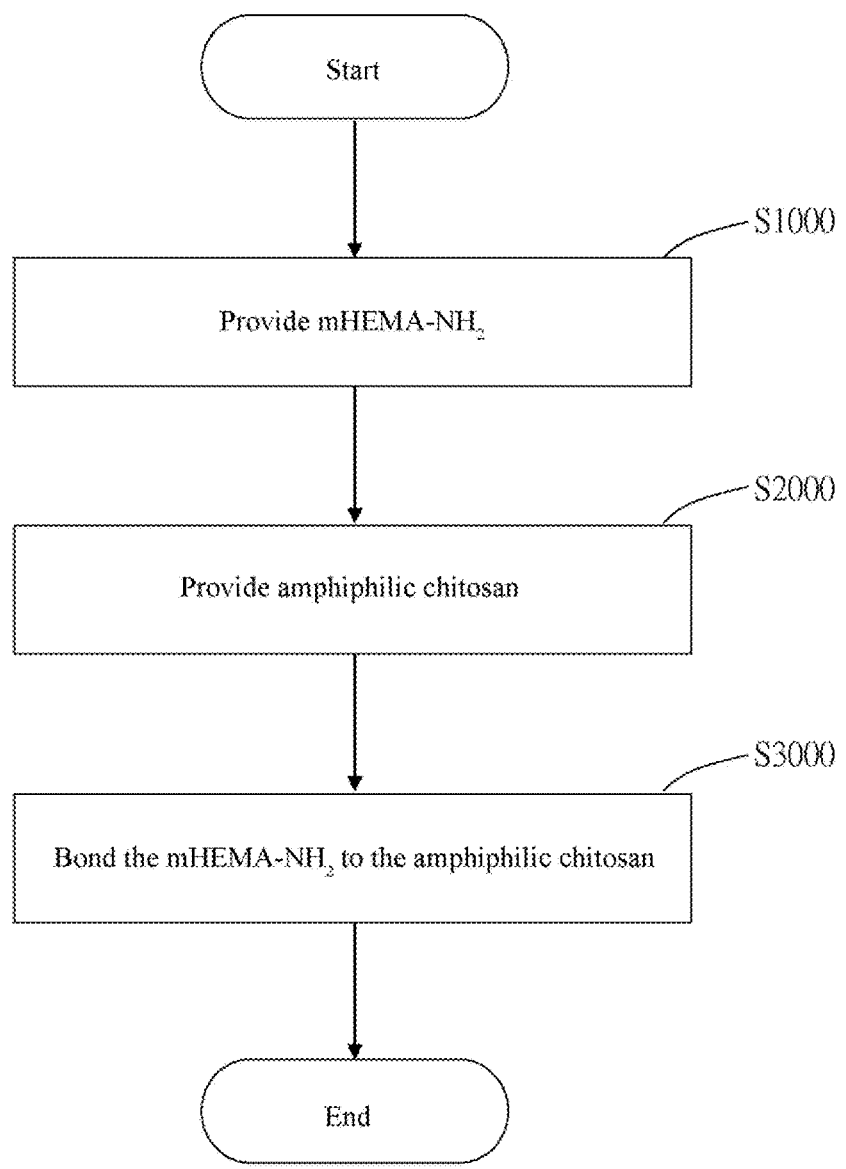
FIG. 1 is a schematic flow chart of an embodiment of an amphiphilic polymer manufacturing method according to the present invention.

As shown in the flow chart of the embodiment shown in FIG. 1, in one embodiment, the amphoteric polymer manufacturing method includes, for example, the following steps.

In step S1000, mHEMA-NH$_2$ is provided. Further, in one embodiment, in the step S1000, mHEMA is dissolved in dichloromethane, and then, 4-toluenesulfonyl chloride (TsCl) is added and uniformly stirred in a reaction flask to cause a reaction. A catalyst 4-dimethylaminopyridine (DMAP) is added and stirred. After the reaction, the pH value of an obtained mixture is adjusted to a neutral value with hydrochloric acid and deionized water, and then the mixture is extracted to obtain a crude product of mHEMA-4-toluenesulfonyl-grafted (mHEMA-Ts). The product is purified by column chromatography to obtain the pure compound mHEMA-4-toluenesulfonyl-grafted. Then, ethylene diamine and potassium carbonate are added into tetrahydrofuran, meanwhile the mHEMA-4-toluenesulfonylgrafted is dissolved, and the solution is heated and refluxed. After the reaction, the solution is naturally cooled to room temperature, and is subjected to vacuum drying to obtain the crude product mHEMA-NH$_2$.

In step S2000, amphiphilic chitosan is provided. Further, in one embodiment, in the step S2000, amphiphilic chitosan (CHC) powder having a carboxyl modified hydrophilic end (carboxyl group) and a long carbon chain modified hydrophobic end (hexanoyl group) is dissolved in water to form an amphiphilic chitosan solution.

In step S3000, the mHEMA-NH$_2$ is bonded to the amphiphilic chitosan. Further, in one embodiment, in the step S3000, under the condition of stirring, N-hydroxysuccinimide (NHS) is added to the amphiphilic chitosan solution, the compound mHEMA-NH$_2$ is added to the amphiphilic chitosan solution under the condition of stirring to ensure that the mixture is uniformly distributed. Then, 1-ethyl-3-(3-dimethylaminopropyl)carbodiimide (EDC) is added to the solution and stirred for reaction. Finally, the product is purified by a dialysis membrane and subjected to vacuum drying to obtain the final product mHEMA-amphiphilic chitosan (mHEMA-CHC) polymer material.

Figure 2A:
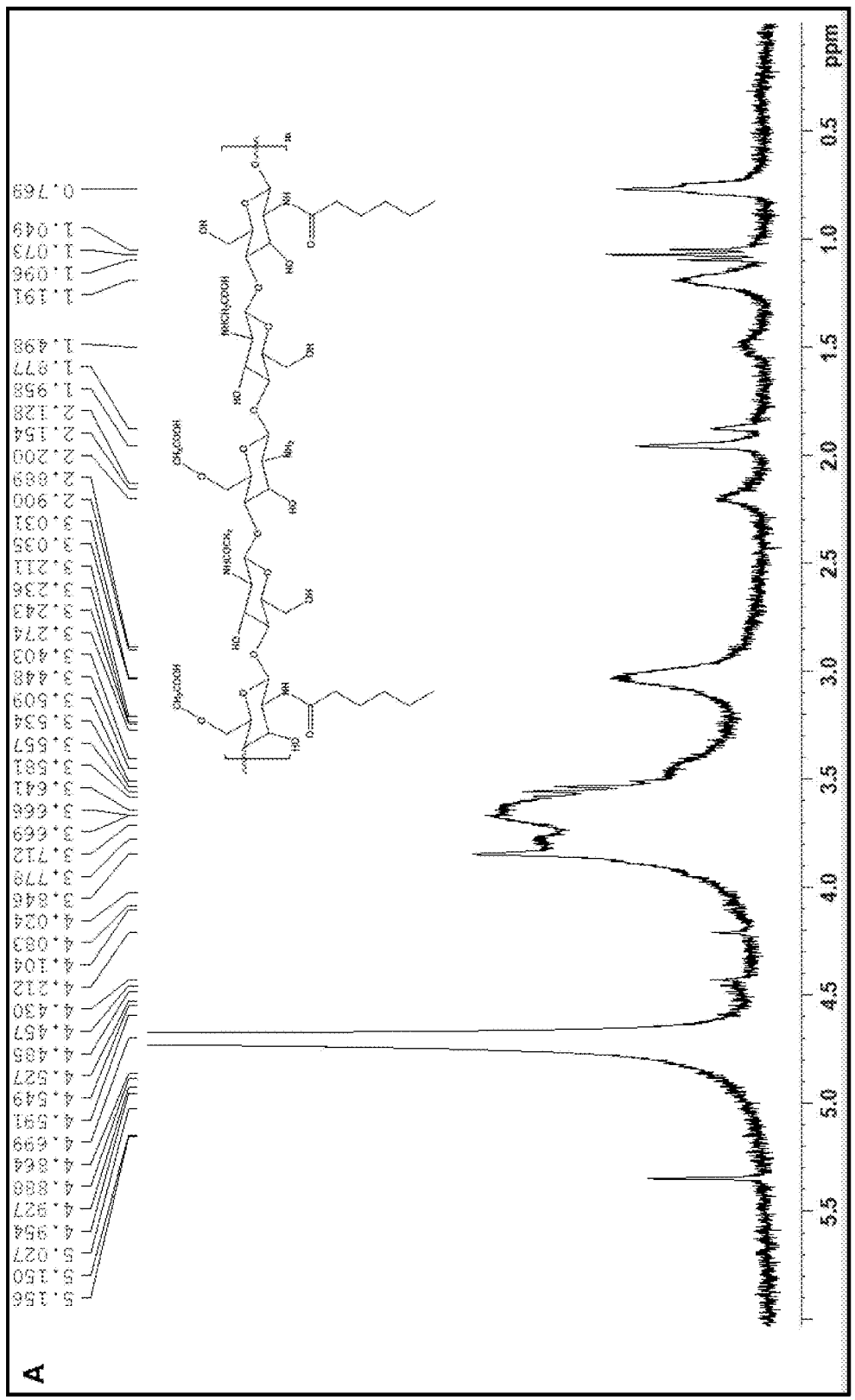
FIG. 2A and FIG. 2B are graphs showing test results of a nuclear magnetic resonance spectrometer.
Figure 2B:
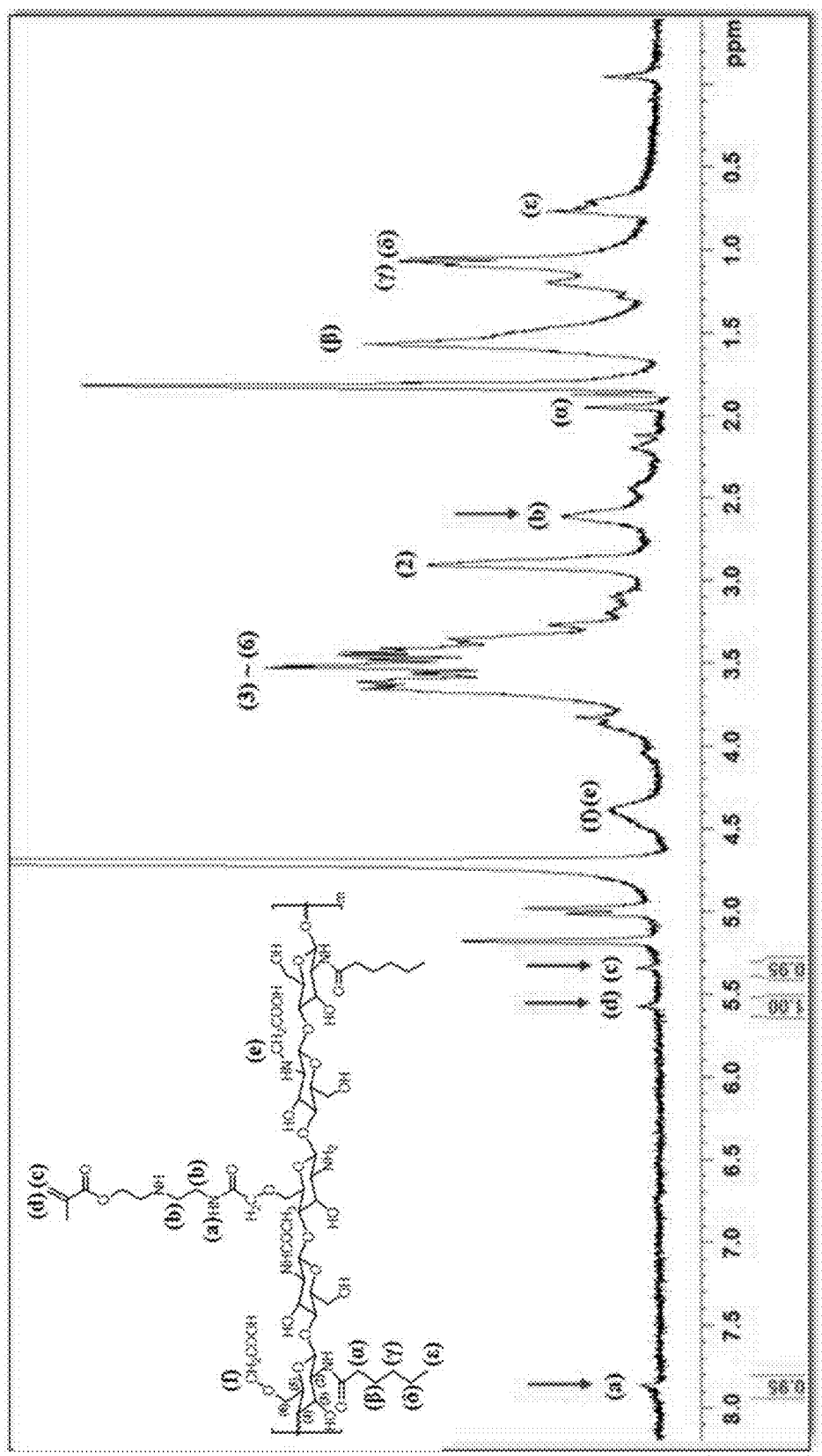

The amphiphilic chitosan (CHC) and the mHEMA-amphiphilic chitosan manufactured in the above process are dissolved in D$_2$O, and separately prepared into a concentration of 3 wt %. Then the chemical structures are determined by a nuclear magnetic resonance spectrometer (NMR 500, America VARIAN), and the results are shown in FIG. 2A and FIG. 2B. As can be seen from the results of FIGS. 2A and 2B, the characteristic peak of the mHEMA has been successfully bridged to the —COOH group of the amphiphilic chitosan molecule.

Figure 3:
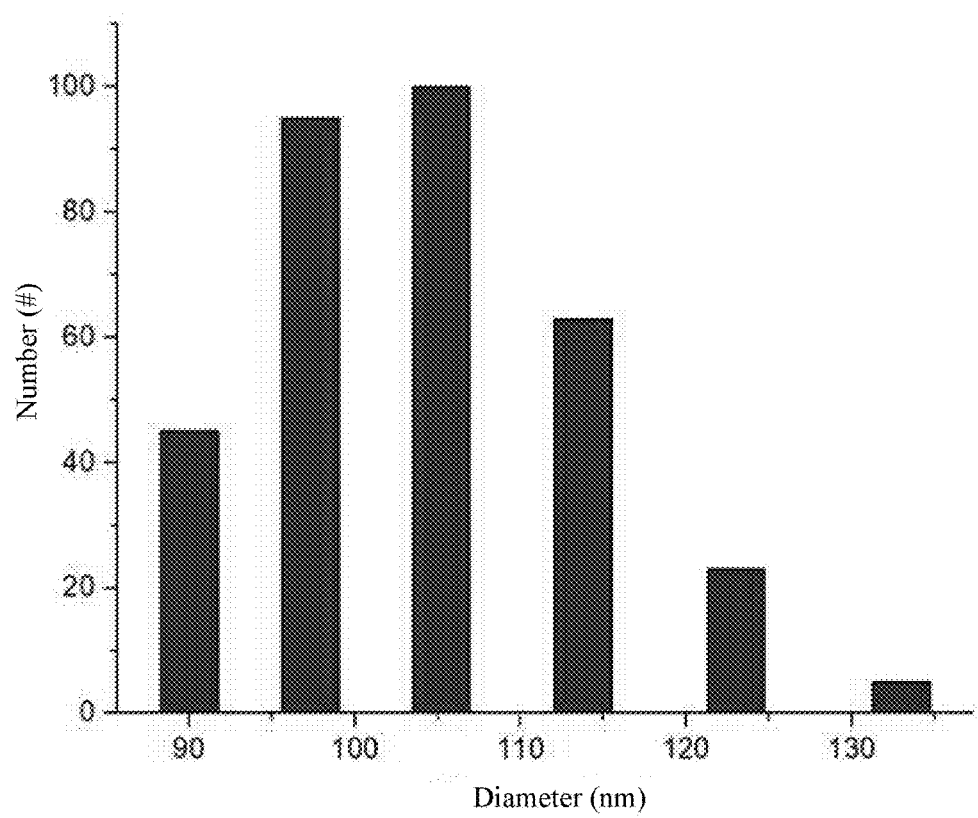
FIG. 3 is a graph showing results of a dynamic light scattering test.

The mHEMA-amphiphilic chitosan produced by the above process is subjected to a Dynamic Light Scattering (DLS) test (BI-200SM Goniometer, Brookhaven Instruments Corporation, USA), and the results are shown in FIG. 3. As can be seen from FIG. 3, the average particle diameter is about 104 nm, which indicates that the mHEMA-CHC novel polymer has self-assembly capability and can form nanoparticles in an aqueous solution.

The mHEMA-amphiphilic chitosan produced by the above process is subjected to a Zeta-potential test (BI-200SM Goniometer, Brookhaven Instruments Corporation, USA), and the results are shown in Table 1.

TABLE 1

| Type | pH value | Zeta-potential (mV) |
| --- | --- | --- |
| CHC | 3.74 | 30.67 ± 0.93 |
| mHEMA-CHC | 3.74 | 27.39 ± 1.57 |
| mHEMA-CHC | 7.4 | −4.08 ± 1.00 |
| mHEMA-CHC | 8.74 | −11.51 ± 0.56 |

It can be seen from Table 1 that the surface charge of the mHEMA-amphiphilic chitosan exhibits positive and negative different surface charges in different pH solutions.

The mHEMA-amphiphilic chitosan can be used as a contact lens material. Further, an amphiphilic polysaccharide is covalently bonded to the mHEMA to form an amphiphilic covalent polymer which has a self-assembly capability. After the mHEMA is bonded to the amphiphilic polysaccharide, and then polymerized with poly(HEMA) (p-HEMA) or silicone, a relatively stable copolymer complex containing amphiphilic mHEMA-polysaccharide nanoparticle-p-HEMA (or silicone) will be formed. The amphiphilic mHEMA-polysaccharide nanoparticles also can be immobilized in poly-HEMA or a silicone substrate to increase water retention, hydrophilicity, bioaffinity, and drug loading function. It will be beneficial to the innovative development of hydrogel or silicone hydrogel materials in functionalized medical materials and drugs.

The amphiphilic polymer is tested as a contact lens material.

Different concentrations of mHEMA-CHC polymers are added to p-HEMA hydrogel, then a Young's modulus test (Tytron™ 250 Microforce Testing System, MTS Systems Corporation, USA) is carried out, and the results are shown in Table 2.

TABLE 2

| Type | Young's modulus (MPa) |
| --- | --- |
| Pure HEMA (p-HEMA) | 0.27 ± 0.09 |
| 0.1 wt % mHEMA-CHC in p-HEMA | 0.24 ± 0.02 |
| 0.5 wt % mHEMA-CHC in p-HEMA | 0.38 ± 0.02 |

It can be seen from Table 2 that addition of a small amount of mHEMA-CHC can effectively increase the mechanical properties of p-HEMA, which can increase the comfort of use and structural integrity. This mechanical property also shows that mHEMA-CHC nanoparticles and p-HEMA hydrogel substrate can form a covalent bond during UV photopolymerization.

Penetration Test

The polymer is made into a lens test piece (standard test piece: middle thickness: 80 um, peripheral thickness: 100 um), and is tested with a UV-Visible spectrometer (Evolution 300, Thermo), and the results are shown in Table 3A. On the other hand, the same test is also carried out on commercially available lenses as a comparison, and the results are shown in Table 3B.

TABLE 3A

| Type | Penetration in a visible light range (400-700 nm) |
| --- | --- |
| Pure HEMA (p-HEMA) | 96%-99% |
| 0.1 wt % mHEMA-CHC in p-HEMA | 96%-99% |
| 0.5 wt % mHEMA-CHC in p-HEMA | 93%-98% |

TABLE 3B

| Commercial brands | Penetration in a visible light range (400-700 nm) |
| --- | --- |
| Brand 1 | 97.9% |
| Brand 2 | 89.5% |

It can be seen from Tables 3A and 3B that addition of 0.5 wt % of mHEMA-CHC nanoparticles to p-HEMA hydrogel to make a lens test piece will result in a slight decrease in transparency, that is, from 96% to 93%. However, it is not much different from the commercially available brand lenses, and its penetration is quite good.

Extensibility Test

Different concentrations of mHEMA-CHC polymers are added to p-HEMA hydrogel, and then an extensibility test (Tytron™ 250 Microforce Testing System, MTS Systems Corporation, USA) is carried out, and the results are shown in Table 4.

TABLE 4

| Type | Elongation ratio (%) |
|---|---|
| Pure HEMA (p-HEMA) | 279.3 ± 14.05 |
| 0.1 wt % mHEMA-CHC in p-HEMA | 311.6 ± 23.21 |
| 0.5 wt % mHEMA-CHC in p-HEMA | 302.0 ± 17.41 |

It can be seen from Table 4 that addition of a small amount of mHEMA-CHC can effectively increase the extensibility of p-HEMA hydrogel, which can increase the comfort of use and structural integrity. This mechanical property also shows that mHEMA-CHC nanoparticles and p-HEMA hydrogel substrate can form a covalent bond during UV photopolymerization.

Figure 4:
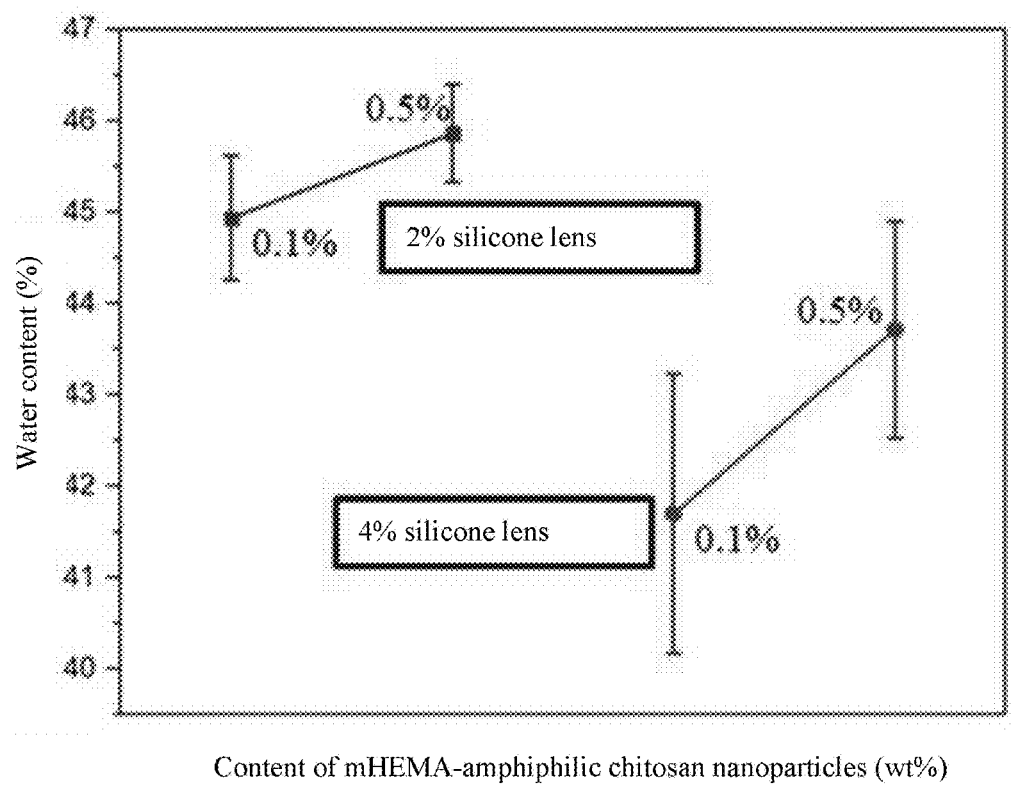
FIG. 4 is a graph showing results of a water content test.

Water Content Test 0.1 wt % and 0.5 wt % of mHEMA-CHC nanoparticles are added to silicone hydrogel (containing 2 wt % silicone and 4 wt % silicone), and the lens is dried in an oven and weighed (Wd). Then the lens is immersed in deionized water until it is saturated, the surface moisture is dried, the lens is weighed (Ww), and the water content is calculated according to Water content (%)=100%×(Ww−Wd)/Wd. It can be seen from the water content test results shown in FIG. 4, the addition of more mHEMA-CHC nanoparticles in different silicone hydrogel substrates will increase the water content significantly. It is speculated that this may be due to the influence of the —COOH and —NH$_2$ functional groups in the amphiphilic chitin molecule, since the —COOH and —NH$_2$ functional groups are highly hydrophilic groups.

Water Retention Test

The above lens is dried in an oven and weighed (Wd), when the lens is saturated, the surface moisture is dried, and the lens is weighed (Ww). Then the lens is placed in a closed container, and weighed (Wt) at intervals.

The water retention can be calculated by the following formula:

Water Retention (%)=100%×(Wt−Wd)/(Ww−Wd)

Figure 5:
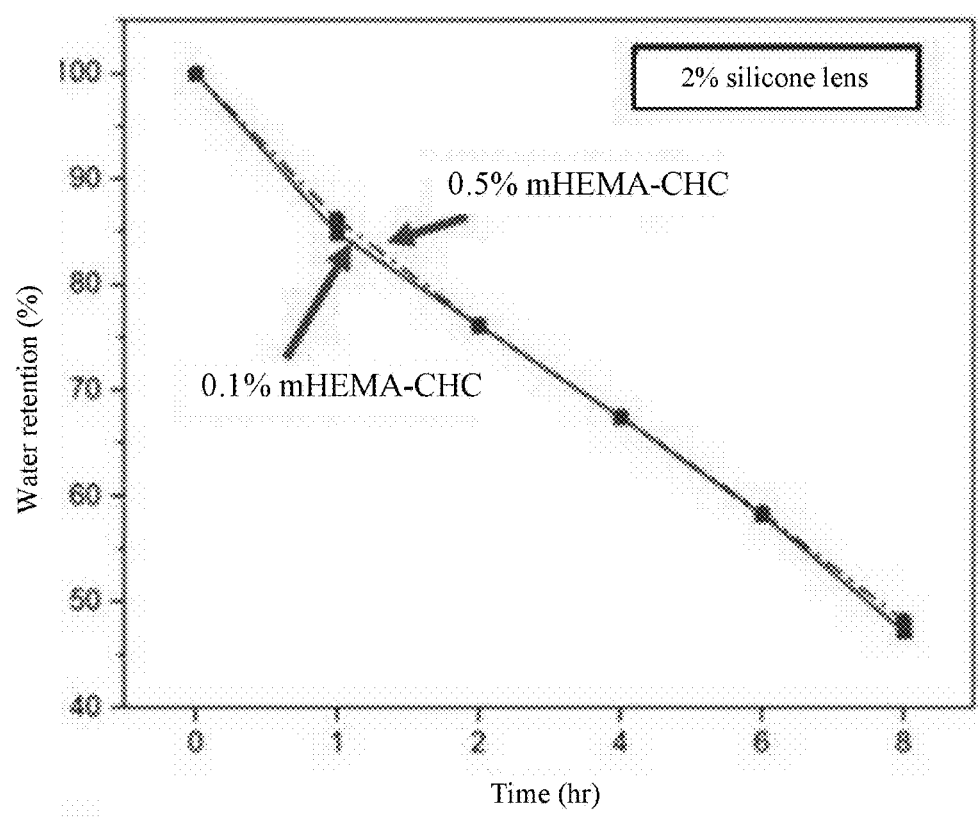
FIG. 5 is a graph showing results of a water retention test.

As shown in FIG. 5, in the water retention test, the addition of more mHEMA-CHC nanoparticles in different silicone hydrogel substrates will increase the water retention significantly. It is speculated that this may be due to the influence of the —COOH and —NH$_2$ functional groups in the amphiphilic chitin molecule, since the —COOH and —NH$_2$ functional groups are highly hydrophilic groups.

In Vitro Drug Release Test

Figure 6:
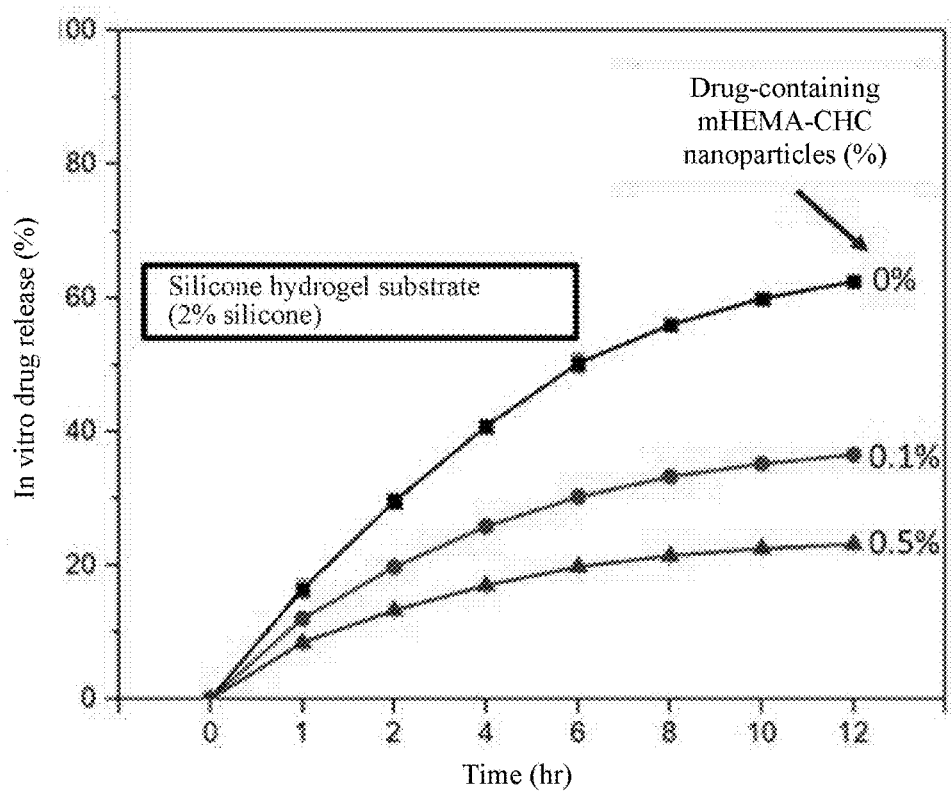
FIG. 6 is a graph showing the results of a drug release test.

Different amounts of mHEMA-CHC (0%, 0.1 wt %, and 0.5 wt %) nanoparticles are added to silicone substrates (2 wt % silicone), and each substrate sample contains 11 ug of latanoprost (glaucoma drug, oil-soluble). The drug-containing substrates are placed in a phosphate buffer solution at a temperature of 28° C. for in vitro drug release testing. The test results are shown in FIG. 6. It can be seen from FIG. 6 that increasing the mHEMA-CHC content can greatly adjust the release rate of latanoprost drugs, increase the time course of use, and at the same time achieve the clinical demand for stable release of drugs.

According to the above test results, the amphiphilic polymer has good mechanical properties, penetration, extensibility, water content, water retention and cell compatibility as a contact lens material, and improves the problem that silicone components are added to commercially available contact lenses in order to increase the oxygen permeability, but the phenomena of reduced transparency and insolubility are caused. On the other hand, the aforementioned lens has the ability to coat a drug and is capable of releasing the drug. In various embodiments, the drug is not limited to glaucoma drugs, and may include, for example, an antiallergic drug, a pinkeye drug, and the like. Specifically, in the manufacturing process of the above lens, the drug is mixed with the mHEMA-CHC polymer, deionized water and a hydroxyethylmethacrylate (HEMA) monomer solution as a material of the contact lens, and further made into a contact lens, thereby loading the drug into the lens.

Although the foregoing description and drawings have disclosed the preferred embodiments of the present invention, it should be understood that various additions, multiple modifications and substitutions may be used in the preferred embodiments of the present invention without departing from the spirit and scope of the principles of the present invention as defined by the appended claims. Modifications of various forms, structures, arrangements, ratios, materials, components and parts can be made by those skilled in the art to which the present invention pertains. Therefore, the embodiments disclosed herein are to be considered as illustrative but not restrictive to the present invention. The scope of the present invention is defined by the scope of the appended claims, covers its legal equivalents and is not limited to the foregoing description.

SYMBOL DESCRIPTION

Step S100

Step S200

Step S300

What is claimed is:

1. An amphiphilic polymer, comprising:
   amino-conjugated mono-HEMA (mHEMA-NH$_2$); and
   amphiphilic chitosan bonded to the mHEMA-NH$_2$,
   wherein the amphiphilic polymer has having the following structure:

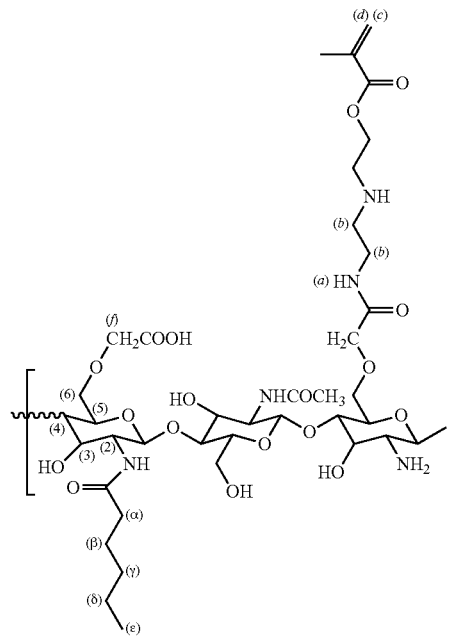

-continued

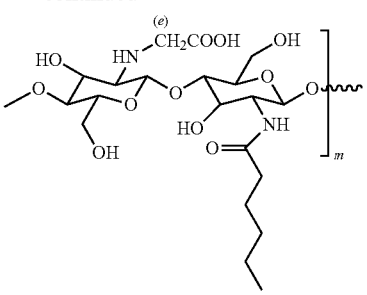

2. A contact lens material, comprising the amphiphilic polymer according to claim 1.

3. An amphiphilic polymer manufacturing method for manufacturing the amphiphilic polymer of claim 1, including:
(S1000) providing amino-conjugated mono-HEMA (mHEMA-NH$_2$);
(S2000) providing amphiphilic chitosan; and
(S3000) bonding the mHEMA-NH$_2$ to the amphiphilic chitosan.

4. The method according to claim 3, comprising a step of reacting ethylene diamine, potassium carbonate, and mHEMA-4-toluenesulfonyl-grafted (mHEMA-Ts) to obtain the mHEMA-NH$_2$.

5. The method according to claim 4, comprising a step of reacting mHEMA with 4-toluenesulfonyl chloride (TsCl) to obtain the HEMA-4-toluenesulfonyl-grafted.

6. The method according to claim 5, further comprising during reaction of the mHEMA with 4-toluenesulfonyl chloride, using 4-dimethylaminopyridine (DMAP) as a catalyst.

7. The method according to claim 3, wherein the step S3000 comprises using 1-ethyl-3-(3-dimethylaminopropyl) carbodiimide (EDC) as a catalyst.

8. The method according to claim 3, wherein the step S3000 comprises using N-hydroxysuccinimide (NHS) as a catalyst.

* * * * *